United States Patent
McKenzie et al.

(10) Patent No.: US 6,896,395 B2
(45) Date of Patent: May 24, 2005

(54) VEHICULAR RETRACTABLE INTERIOR LIGHTING SYSTEM

(75) Inventors: John S. McKenzie, Ferndale, MI (US); Jeff A. Kempf, Romeo, MI (US)

(73) Assignee: Lear Corporation, Southfield, MI (US)

( * ) Notice: Subject to any disclaimer, the term of this patent is extended or adjusted under 35 U.S.C. 154(b) by 76 days.

(21) Appl. No.: 10/633,210

(22) Filed: Aug. 1, 2003

(65) Prior Publication Data

US 2005/0024886 A1 Feb. 3, 2005

(51) Int. Cl.$^7$ ............................. B60Q 3/00; F21V 21/32
(52) U.S. Cl. ..................... 362/490; 362/250; 362/251; 362/387; 362/488; 362/530; 362/543
(58) Field of Search ............................... 362/238, 239, 362/250, 251, 258, 387, 487, 488, 490, 523, 362/529, 530, 532, 543

(56) References Cited

U.S. PATENT DOCUMENTS

| | | | | |
|---|---|---|---|---|
| 1,523,498 A | * | 1/1925 | Stark | 362/489 |
| 1,656,648 A | * | 1/1928 | Woller | 362/387 |
| 3,213,419 A | * | 10/1965 | Stults | 362/523 |
| 4,378,473 A | * | 3/1983 | Noorigian | 362/387 |
| 4,443,831 A | * | 4/1984 | Godfrey et al. | 362/140 |
| 4,867,498 A | * | 9/1989 | Delphia et al. | 296/37.7 |
| 5,077,643 A | | 12/1991 | Leach | 362/183 |
| 5,521,806 A | * | 5/1996 | Hutzel et al. | 362/258 |
| 5,548,492 A | | 8/1996 | Hansen et al. | 362/492 |
| 5,564,771 A | | 10/1996 | Chesters | 296/97.5 |
| 5,599,089 A | * | 2/1997 | Sheu et al. | 362/250 |
| 6,257,745 B1 | | 7/2001 | Speth et al. | 362/488 |
| 6,471,378 B1 | | 10/2002 | Ziegerer et al. | 362/490 |
| 6,811,288 B2 | * | 11/2004 | Hutzel | 362/486 |

* cited by examiner

*Primary Examiner*—Alan Cariaso
(74) *Attorney, Agent, or Firm*—Bill C. Panagos

(57) ABSTRACT

A console lighting assembly is provided for illuminating an interior of a vehicle comprising a housing assembly mounted in the interior of a vehicle passenger compartment. A plurality of pulleys are positioned in the housing assembly, each of the plurality of pulleys is individually rotatable. A plurality of illumination units each includes a respective cable and a light generator at a distal end of the cable. Each cable is spooled on a respective pulley and the illumination units are movable between a retracted position and an extended position. A plurality of switch pads are located on the housing assembly and are positioned around the plurality of illumination units for activating and deactivating a respective illumination unit. A retractor is coupled to the pulleys for retracting the plurality of illumination units from the extended position to the retracted position. Each of the plurality of illumination units is pliable so as to maintain a selected orientation of illumination as determined by a user.

14 Claims, 3 Drawing Sheets

VEHICULAR RETRACTABLE INTERIOR LIGHTING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to an interior lighting system within a vehicle, and more specifically, to a retractable interior light capable of lighting a selectable area of the vehicle.

2. Description of the Related Art

Typical vehicle lighting systems include an overhead, fixed ceiling-mount lighting system having an illumination bulb angled downward or at a specific angle into the vehicle passenger compartment. These lighting systems are fixed in a central position within the interior of the vehicle (e.g. front overhead console or rear overhead console) and illuminate a fixed area within the vehicle predetermined by the vehicle manufacturer. The fixed areas are setup to provide lighting generally to one or more persons sitting in the vehicle. Drawbacks with this type of lighting system are that the main focus of the lighting system may not include the desired location where a passenger needs illumination. That is, rather than bringing the main focus of the lighting system to where the passenger would like to have it directed, the passenger must be content with using the peripheral lighting received from the lighting system to illuminate the intended viewing area, or if possible, bring the intended object (e.g. a book or map) into the directly lit.

Another drawback with a fixed lighting system is the leakage of light to unintended areas. For example, other passengers seated in the vehicle who are resting may be irritated or disturbed by misdirected light. An issue with fixed lighting systems is that although it may be convenient to one person desiring the illumination, it may be undesirable to the surrounding passengers not requiring the illumination.

SUMMARY OF THE INVENTION

The present invention provides a console housing having a plurality of individually extendable and retractable illumination units mounted on a pulley system for maintaining a selectable orientation of illumination. A single crank on the pulley system is arranged to retract any of the plurality of illumination units that may be extended.

In one aspect of the invention, a console lighting assembly is provided for illuminating an interior of a vehicle comprising a housing assembly mounted in the interior of a vehicle passenger compartment. A plurality of pulleys are positioned in the housing assembly, each of the plurality of pulleys is individually rotatable. A plurality of illumination units each includes a respective cable and a light generator at a distal end of the cable. Each cable is spooled on a respective pulley and the illumination units are movable between a retracted position and an extended position. A plurality of switch pads are located on the housing assembly and are positioned around the plurality of illumination units for activating and deactivating a respective illumination unit. A retractor (e.g. crank) is coupled to the pulleys for retracting the plurality of illumination units from the extended position to the retracted position. Each of the plurality of illumination units is pliable so as to maintain a selected orientation of illumination as determined by a user.

DETAILED DESCRIPTION OF PREFERRED EMBODIMENTS

Figure 1:
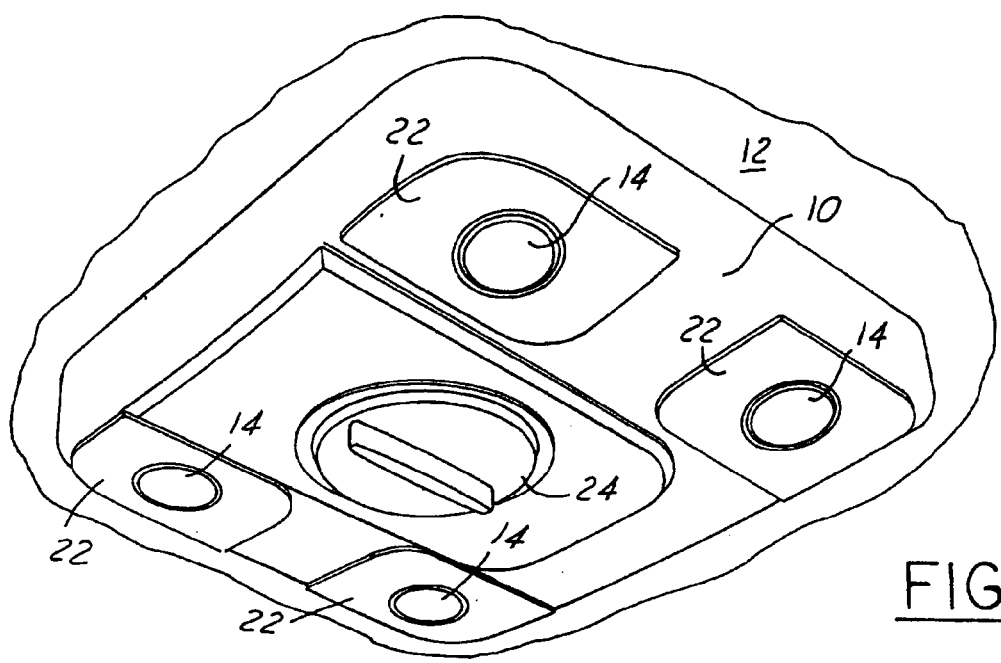
FIG. 1 is a perspective view of an interior vehicle retractable lighting system.

Referring now to the Drawings and particularly to FIG. 1, there is shown an extendable and retractable interior vehicle illumination system. The illumination system includes a console housing assembly for encasing and concealing the components of the illumination system. The console housing 10, generally square shaped, is mounted in a central location within the interior compartment and is attached to or in close proximity to a headliner 12. Alternatively, the console housing 10 may be mounted in other locations within the vehicle such as a non-overhead console surface, but optimally a preferred location is one where the console housing 10 is at an even distance and unobstructed to all passengers within the vehicle. Illumination units 14 are position on the bottom surface of the console housing 10. Each illumination unit is extendable from a retracted position. When in a retracted position, the illumination unit is flush with the exterior surface of the console housing 10. Each of the illumination units 14 includes a cable 16 and a light generator 18. The light generator 18 and the cable 16 may comprise an incandescent bulb and an electric cable. Alternatively, the illumination unit could be an LED, a light pipe, or a fiber optic system. A plurality of pulleys 20 (shown in FIG. 3a) is located within the console housing 10 and each of the plurality of pulleys 20 is individually rotatable. Each respective illumination unit is coupled and spooled about a respective pulley and is movable between a retracted position and an extended position. The cable 16 is made of a shape-retentive pliable material (e.g. ribbed rubber) so that the illumination unit may extended to a desired length and be oriented so as to maintain a selected orientation as determined by a user in the vehicle. A retractor 24 is coupled to the plurality of pulleys 20. The retractor 24 is a dial mechanism which allows the user to rotate or crank the illumination units 14 into the console housing 10 to their retracted position. As the retractor 24 is rotated, any extended illumination unit (from whatever extended length it may be positioned) will retract into the housing to the retracted position.

A plurality of switch pads 22 are located on the bottom exterior surface of the console housing 10 at the periphery of the plurality of illumination units 14 to control the activation and deactivation the illumination units 14. An individual switch pad is associated with the respective illumination unit for coupling them to electrical power. When the illumination units 14 are deactivated and in retracted position, each exterior surface of a switch pad is in a non-depressed position and is flush with the exterior surface of the respective illumination unit. The user depresses a respective switch pad to activate the illumination unit. The respective switch pad maintains a depressed position within the console housing 10, thereby allowing the user to grasp and extend the respective illumination unit.

Figure 2:
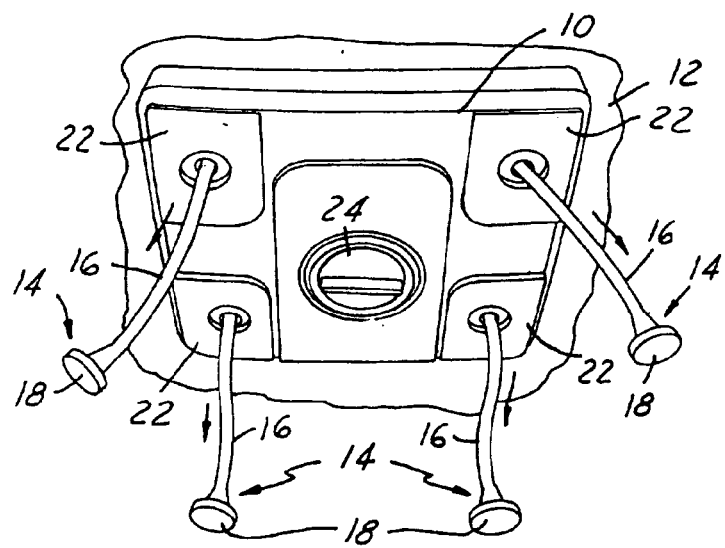
FIG. 2 is a perspective view of the interior vehicle retractable lighting system with illumination units in an extended position.

FIG. 2 shows an illumination system with the illumination units 14 in the extended position. Each of the illumination units 14 is individually extendable so that the desired length is chosen for each by the user. Furthermore, since the cable is made of a pliable material, each illumination unit may be oriented to focus on the specific area that a user selects. Because illumination of the illumination unit is focused on a specific area as chosen by a user, there are less chances that the illumination unit will distract other passengers within the vehicle. With the present invention, a lower brightness light source may be used since illumination is accurately focused where it is needed.

Figure 3A:
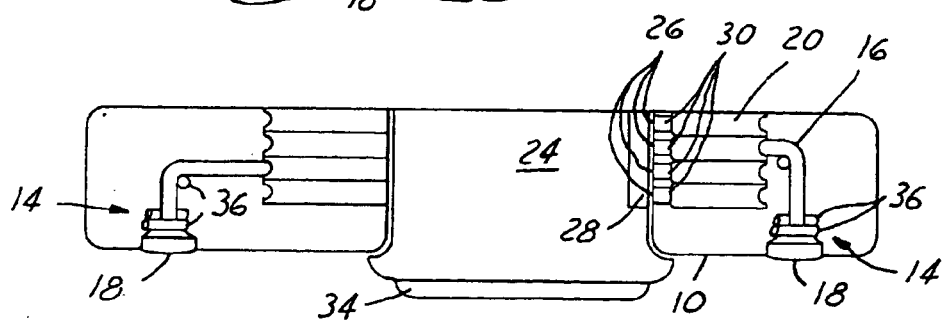
FIG. 3a is a side view of the retractor and pulley system according to a first preferred embodiment.

FIG. 3a illustrates a side sectional view of the retractor 24 and pulley system. The retractor 24 is rotatable within the center of the plurality of pulleys 20. Four pulleys circumferentially surround the retractor 24. Each respective cable is spooled about each respective pulley. A catch 26 is integrally attached or formed on an inner circumference of each pulley. Each catch may be molded as part of each pulley when produced or may be a separate unit mechanically attached thereafter. A latch 28 is integrally attached or formed to an outer circumference of the retractor 24 facing the plurality of pulleys 20. The latch 28 may be molded as part of the retractor 24 or may be a separate unit mechanically attached. The latch 28 may be one continuous protrusion extending axially along the retractor 24. The latch 28 is used to abut the catch 26 and rotate the pulleys along with the illumination units 14 from their extended to their retracted position. The cables are shown extending from the pulley system to a plurality of openings in the console housing 10 where the illumination units 14 are seated in the retracted position. A plurality of roller guides 36 may be used to assist in guiding the cable 16 from the pulley system to a respective opening. Other types of guides, pulleys, or rollers known in art may be used to guide the cable 16 to the respective opening.

Figure 3B:
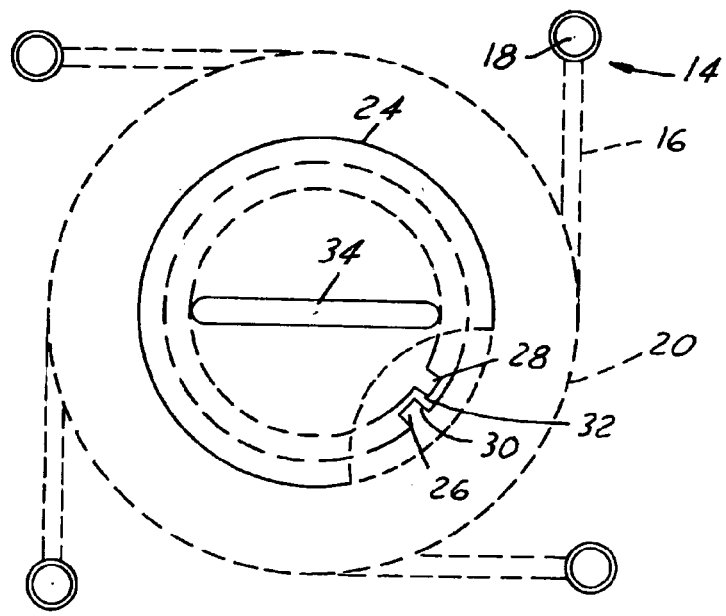
FIG. 3b is a partial cut-away view of the retractor and pulley system according to the first preferred embodiment.

FIG. 3b illustrates is a partial cut-away view of the dial and pulley system according to the first preferred embodiment. The dial mechanism includes a crank handle 34 which is utilized to manually rotate the retractor 24 so as to retract the illumination units 14. The retractor 24 may include a top shell cover which conceals the gap between the retractor 24 and the plurality of pulleys for aesthetic purposes. Shown in the partial cut-away view is the interaction between the catch 26 and the latch 28. When a respective illumination unit is extended, a respective pulley associated with the extended respective illumination unit rotates counter-clockwise. As the respective pulley is rotated, an edge surface of the catch 30 of the respective pulley will abut an edge surface of the latch 28 and rotate the retractor 24 accordingly to a desired extended position. If the respective illumination unit is not fully extended and a next respective illumination is extended beyond the rotational point of the latch 28, then the catch of a next respective pulley will abut the latch 28 as it is rotated beyond the rotational point of the catch 26 and continue to rotate the retractor 24 to a next extended position. The retractor 24 will continue to rotate with a farthest extended illumination unit until no other illumination units 14 are farther extended or until at least one illumination unit is fully extended. When the illumination units 14 are to be retracted, the user will rotate the dial mechanism in a clockwise direction. The edge surface 30 will abut against each edge surface of each respective catch as the dial mechanism is rotated clockwise and rotate each respective pulley, and as a result, return each extended illumination unit back to the retracted position.

Figure 4A:
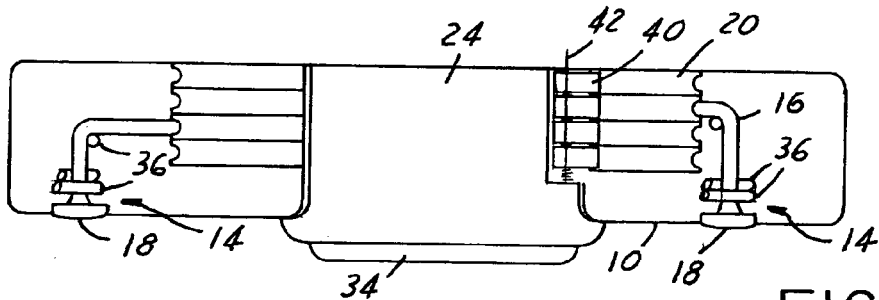
FIG. 4a is a side view of the retractor and pulley system according to a second preferred embodiment.

FIG. 4a illustrates a side sectional view of the latch and the catch mechanism according to a second preferred embodiment. The retractor 24 includes a plurality of latches as opposed to one continuous latch as depicted in FIG. 3a. A pivot rod 42 is positioned axially along an outer circumference of the retractor 24. Each latch is mounted on the pivot rod 42 to that so that each latch is individually pivotable about the pivot rod 42. An individual latch spring 44 is coupled to each respective latch and the pivot rod 42.

Figure 4B:
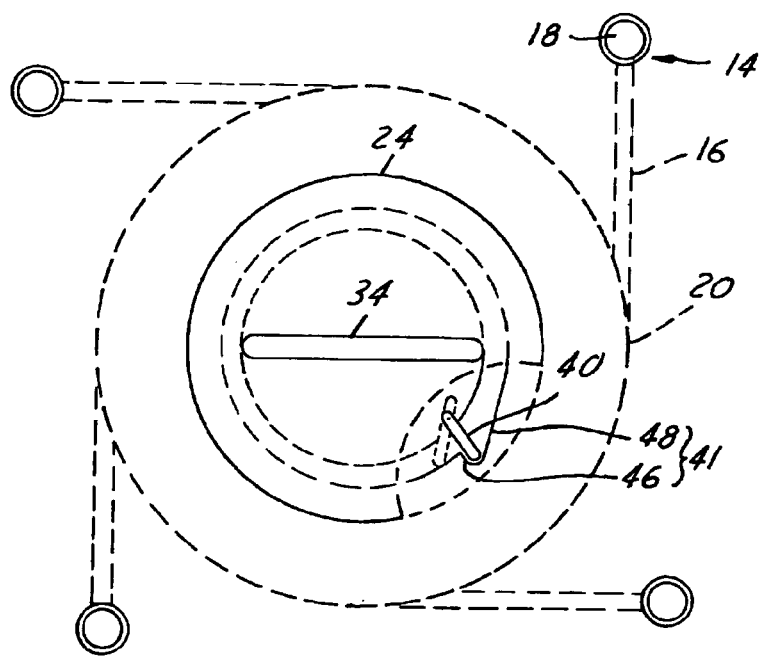
FIG. 4b is a partial cut-away view of the retractor and pulley system according to the second preferred embodiment.

FIG. 4b is a partial cut-away bottom view of the latch and catch mechanism according to the second preferred embodiment. The latch spring 44 is mounted such that the latch 40 corresponding to an individual pulley is in a radial extended position when the latch spring 44 is unloaded. When the latch spring 44 is unloaded, the latch 40 is circumferentially positioned along the inner circumference of the individual pulley. Each pulley includes an individual catch 41. Each individual catch 41 forms a recess in the inner circumference wall of the plurality of pulleys 20 resembling a cam. A first edge of the cam 46 includes a flat surface extending perpendicular from the inner circumference of each pulley to a radial depth within each pulley. The first edge 46 abuts the latch 40 when the latch spring 44 is an unloaded state. At the distal end of the first edge, a sloping edge surface of the cam 48 gradually adjusts latch 40 until the sloping edge surface 48 merges with the inner circumference of each pulley.

As the respective illumination unit is extended to a desired position, the respective pulley will rotate counter-clockwise. The first edge 46 will abut a respective latch and rotate the retractor 24 counter-clockwise. The other respective latches will follow the sloping edge surface of the other respective pulleys and gradually pivot the other respective latches to a circumferential position as the sloping edge surface merges into the inner circumference. As the other respective latches move from the radial position to the circumferential position, the other respective latch springs become loaded. If the respective illumination unit is not fully extended and the next illumination unit is extended beyond that the respective illumination unit, the load of a next respective latch spring (as the retractor 24 is rotated) will force the next respective latch to follow the sloping edge surface of the next respective pulley, thereby pivoting the next respective latch from the circumferential position to the radial position. When the next respective latch is in the radial position, it will abut the edge surface of the next respective catch and rotate the retractor 24 counter-clockwise accordingly. The respective latch will follow the sloping edge surface of the respective pulley and pivot the respective latch accordingly from a radial position to a circumferential position forcing the respective latch spring into a loaded state. The retractor 24 will continue to rotate with a farthest extended illumination unit until no other illumination units 14 are farther extended or until at least one illumination unit is fully extended. When the illumination units 14 are to be retracted, the user will rotate the dial mechanism in a clockwise direction. The edge surface of each latch will follow the sloping edge surface of each pulley to the radial position and abut against each edge surface of each pulley as the dial mechanism is rotated clockwise. As a result, each pulley is rotated clockwise and each extended illumination unit is returns back to the retracted position.

Figure 5A:
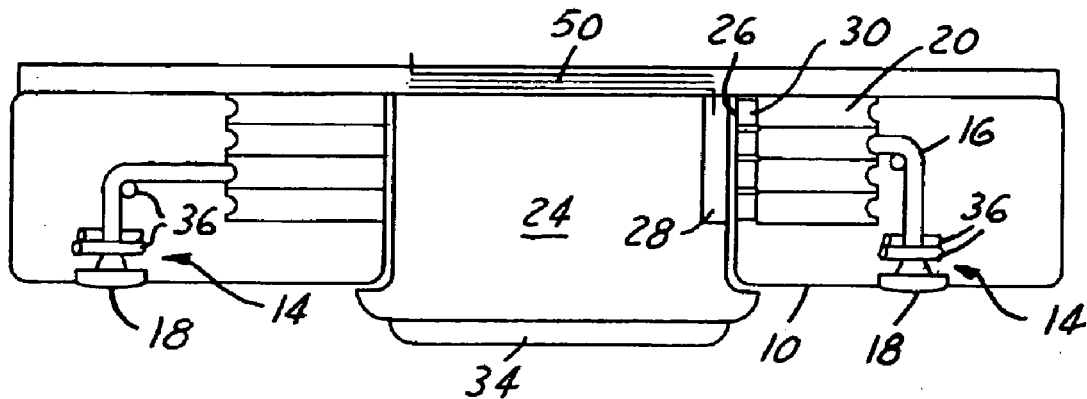
FIG. 5a is a side view of the retractor and pulley system according to a third preferred embodiment.
Figure 5B:
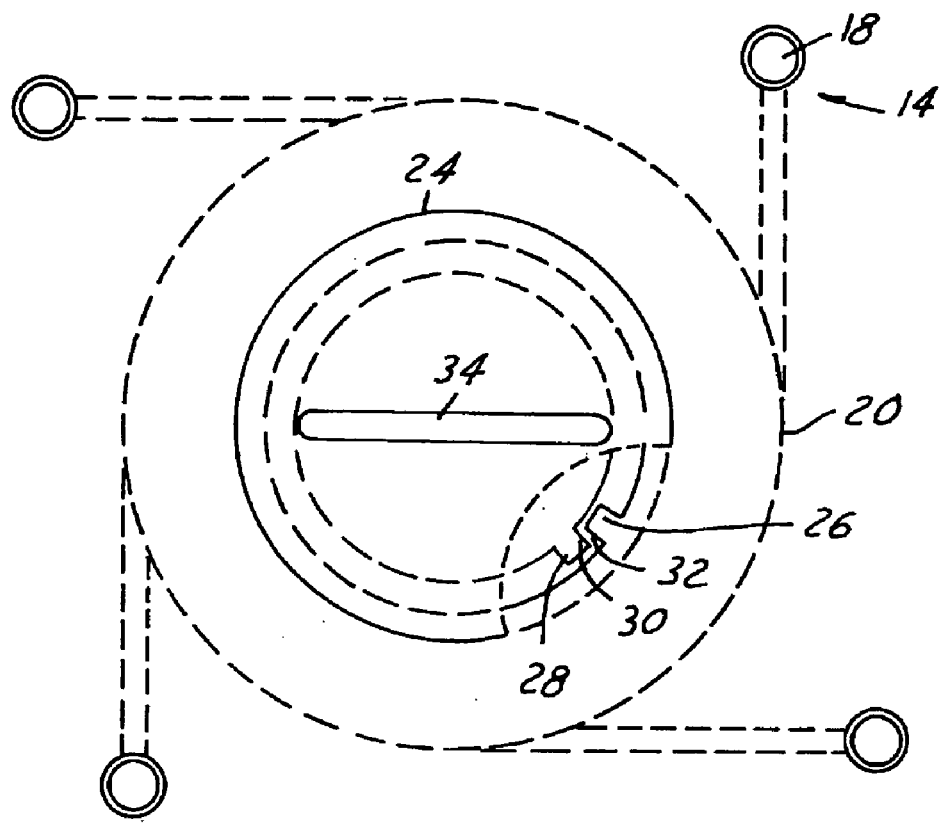
FIG. 5b is a partial cut-away view of the retractor and pulley system according to the third preferred embodiment.

The latch 28 and the catch 26 of FIG. 5a is identical to that of FIG. 3a except that the position of the latch 28 and the catch 26 are reversed (i.e. the latch 28 is ahead of the catch 26 in a clockwise direction). The retractor 24 includes a retractor spring 50 (e.g. torsion spring) coupled on a top surface of the retractor 24. When the retractor spring 50 is in an unloaded stated, the retractor 24 is at a crank position. As each illumination unit is extended, each pulley will be rotated counter-clockwise. Because the latch 28 is positioned clockwise to the catch 26, the dial mechanism will not rotate, but rather, will remain fixed while each of the illumination units 14 are extended. When the illumination units 14 are retracted, the user will rotate the dial mechanism in a clockwise direction. As the retractor 24 is rotated clockwise, the latch 28 will abut each catch and each illumination unit will be returned to the retracted position. As each of the illumination units 14 reach the retracted position, the retractor 24 is at a stop position and a load is placed on the retractor spring. When the user releases the dial mechanism, the load placed on the retractor spring 50 forces the retractor 24 to rotate from the stop position to the crank position.

As a result of the forgoing interactions between the retractor 24 and the extendable illumination units, the illumination system is able to adapt to a user's specific lighting needs without the distraction to other occupants. Various lighting elements can be accommodated with various retraction systems throughout the interior of the vehicle to satisfy an occupant's need for illumination. As a result, with the implementation of focused illumination, the lighting source may be a low brightness, concentrated output as opposed to a highly dispersed, high brightness output.

What is claimed is:

1. A console lighting assembly comprising:
   a housing assembly mounted in an interior of a vehicle passenger compartment;
   a plurality of pulleys positioned in said housing assembly, each said plurality of pulleys being individually rotatable;
   a plurality of illumination units each including a respective cable and a light generator at a distal end of said cable, each cable spooled on a respective one of said plurality of pulleys, said illumination units being movable between a retracted position and an extended position;
   a plurality of switch pads located on said housing assembly and positioned around said plurality of illumination units for activating and deactivating a respective illumination unit; and
   a retractor coupled to said pulleys for retracting said plurality of illumination units from said extended position to said retracted position;
   wherein each of said plurality of illumination units is pliable so as to maintain a selected orientation of illumination as determined by said user.

2. The console lighting assembly of claim 1 wherein each of said illumination units is independently extendable to a desired length.

3. The console lighting assembly of claim 1 wherein said retractor includes a dial mechanism operated by said user for retracting said plurality of illumination units into said housing assembly.

4. The console lighting assembly of claim 3 wherein said dial mechanism includes a latch and each of said plurality of pulleys include a respective catch, wherein said latch is secured against said respective catch as said dial mechanism is rotated to retract any of said plurality of illumination units that is in said extended position.

5. The console lighting assembly of claim 4 wherein said dial mechanism includes a plurality of latches each corresponding to a respective pulley, wherein each latch is spring loaded.

6. The console lighting assembly of claim 4 wherein said user rotates said dial mechanism to retract said plurality of illumination units.

7. The console lighting assembly of claim 4 wherein said dial mechanism is rotatable between a crank position and a stop position said crank position corresponding to a position of said retractor when the said illumination units are extended, said stop position correlating to a position of said retractor when said retractor is rotated to retract said illumination units, and said dial mechanism further includes a coil mechanism for automatically returning said dial mechanism from said stop position to said crank position.

8. The console lighting assembly of claim 1 wherein an exterior surface of each of said switch pads surrounds each said illumination unit and is flush with an exterior surface of a respective illumination unit when said respective illumination unit is in said retracted position and deactivated.

9. The console lighting assembly of claim 8 wherein each of said switch pads includes a depressed position for activating said respective illumination unit and an non-depressed position for deactivating said respective illumination unit, and wherein each of said switch pads maintains said depressed position during said activation of said respective illumination unit to allow said user to grasp and extend said respective illumination unit.

10. The console lighting assembly of claim 1 wherein said housing assembly is positioned in an interior overhead console.

11. The console lighting assembly of claim 1 wherein said housing assembly is positioned in a center base console unit.

12. A method for illuminating a selectable area of an interior passenger compartment of a vehicle, the method comprising the steps of:
   providing a plurality of illumination units rotatable about a plurality of pulleys, said illumination units being moveable between a retracted position and an extended position, each illumination unit including a light source attached to a flexible conductor, said flexible conductor encased by a pliable casing;
   providing a plurality of switch pads positioned around said plurality of illumination units for activating and deactivating a respective illumination unit;
   providing a retractor for retracting said plurality of illumination units from said extended position to said retracted position;
   depressing a respective switch pad to activate a respective illumination unit; and
   extending said respective illumination unit from said retracted position wherein said respective illumination unit maintains a selected orientation of illumination as manually determined by said user.

13. The method of claim 12 further comprising the step of retracting said respective illumination unit by rotating a dial mechanism located said housing assembly.

14. The method of claim 13 wherein said retracting step includes rotating said dial mechanism to retract said respective illumination unit.

* * * * *